(12) United States Patent
Kremmel

(10) Patent No.: US 11,959,507 B2
(45) Date of Patent: Apr. 16, 2024

(54) TAPER PIN FOR AN APPLIANCE HOUSING

(71) Applicant: Haier US Appliance Solutions, Inc., Wilmington, DE (US)

(72) Inventor: Aldo Vincent Kremmel, Palmyra, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 211 days.

(21) Appl. No.: 17/520,119

(22) Filed: Nov. 5, 2021

(65) Prior Publication Data

US 2023/0145424 A1    May 11, 2023

(51) Int. Cl.
*A47L 15/42*     (2006.01)
*F16B 5/06*     (2006.01)

(52) U.S. Cl.
CPC ............ *F16B 5/06* (2013.01); *A47L 15/4274* (2013.01)

(58) Field of Classification Search
CPC ............................... F16B 5/06; A47L 15/4274
USPC ......................................................... 312/228
See application file for complete search history.

(56) References Cited

U.S. PATENT DOCUMENTS

| 6,356,321 | B1 | 3/2002 | Ogawa | |
|---|---|---|---|---|
| 7,483,092 | B2 | 1/2009 | Moersch | |
| 8,485,617 | B2* | 7/2013 | Park | F25D 23/028 |
| | | | | 312/405.1 |
| 2016/0117022 | A1* | 4/2016 | Kim | F24C 15/02 |
| | | | | 345/82 |

FOREIGN PATENT DOCUMENTS

| EP | 2610389 B1 | 6/2014 |
|---|---|---|
| EP | 2650613 B1 | 2/2017 |
| EP | 2650614 B1 | 7/2018 |

* cited by examiner

*Primary Examiner* — James O Hansen
(74) *Attorney, Agent, or Firm* — Dority & Manning, P.A.

(57) ABSTRACT

An appliance housing includes a mating component, a confined component, a primary beam, and a pin. The mating component may define an opening. The confined component may be removably connected to the mating component. The primary beam may be elastically moveable relative to the mating component. The pin may be attached to the beam to move therewith between a flexed position and an original position. The pin may extend from a base end proximal to the primary beam to an outer end distal to the primary beam. The pin may be selectively received within the opening to constrain the primary beam relative to the mating component. The primary beam may be flexible to allow the pin to move inward to the flexed direction and return outward to the original position.

20 Claims, 10 Drawing Sheets

TAPER PIN FOR AN APPLIANCE HOUSING

FIELD OF THE INVENTION

The present subject matter relates generally to manufactured housing pieces, and more particularly to housings of, or for, a domestic appliance.

BACKGROUND OF THE INVENTION

In manufacturing, parts are often put together in stages or steps. Each component added to a manufacturing piece may add a step to assembly and installation of the components into the manufacturing piece. Additionally, having many components in a manufacturing piece may complicate or extend repair time. For example, placing parts together by the use of screws takes time, both during manufacturing and when making repairs.

Housings in manufactured pieces, such as appliances, may house or partially envelop more fragile pieces such as electronic components such as wiring for control panels or circuitry for a controller. For example, electronic components may benefit from a housing in appliances such as dishwashers, refrigerators, washers, dryers, ovens, ranges, and the like. Housings may provide a level of stability or some protection to such elements and may be beneficial. To house the components, separate housing elements may be connected together by a screw or a set of screws. Housings may also be connected to other components by use of at least one screw. Hence, housing components such as electrical components may require many components, each component adding time to manufacturing or repair processes. Each component may further contribute to costs, both in assembly and manufacture of the manufacturing piece and in repair and maintenance of the manufacturing piece.

Accordingly, a housing component that could connect and contain other components without the use of a screw would be useful. For example, an appliance with fewer components, would also be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure an appliance housing is provided. The appliance housing may include a mating component defining an opening, a confined component removably connected to the mating component, and a primary beam. The primary beam may be elastically movable relative to the mating component. The appliance housing may further include a pin attached to the primary beam. The pin may be attached to the primary beam to move therewith between a flexed position and an original position. The pin may extend from a base end proximal to the primary beam and an outer end distal to the primary beam. The pin may be selectively received within the opening to constrain the primary beam relative to the mating component. The primary beam may be flexible to allow the pin to move inward in a first direction to the flexed position and may return outward in a direction opposite to the first direction to the original position.

In another exemplary aspect of the present disclosure, an appliance is provided. The appliance may include a cabinet and a housing enclosed by the cabinet. The housing may comprise a mating component defining an opening, a confined component removably connected to the mating component and a primary beam. The primary beam may be elastically moveable relative to the mating component. The housing may further include a pin attached to the primary beam. The pin may be attached to the primary beam to move therewith between a flexed position and an original position. The pin may extend from a base end proximal to the primary beam and an outer end distal to the primary beam. The pin may be selectively received within the opening to constrain the primary beam relative to the mating component. The primary beam may be flexible to allow the pin to move inward in a first direction to the flexed position and may return outward in a direction opposite to the first direction to the original position. The pin can be aligned with the opening defined by the mating component to constrain the confined component relative to the mating component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same of similar reference numerals in the figures denotes the same or similar features unless the context indicates otherwise.

DETAILED DESCRIPTION

Figure 1:
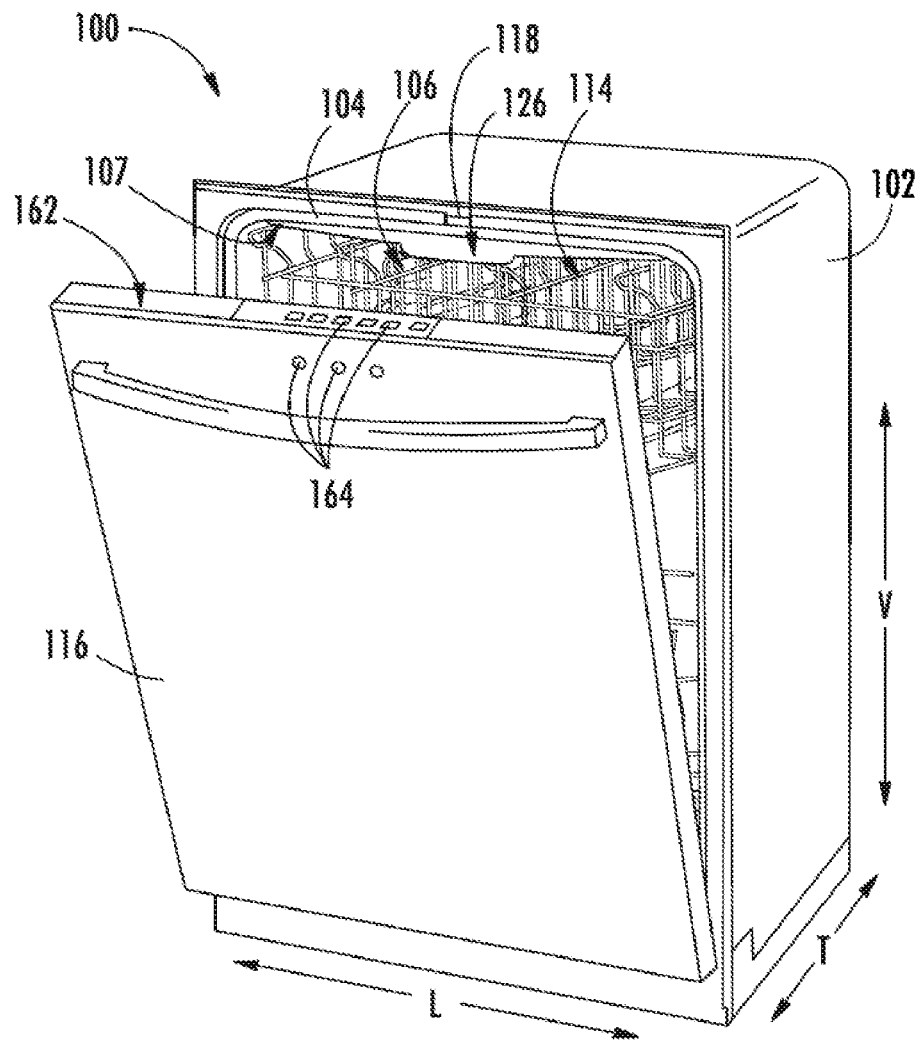
FIG. 1 provides a perspective view of an embodiment of an exemplary dishwasher appliance of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Terms such as "left," "right," "front," "back," "top," or "bottom" are used with reference to the perspective of a user accessing the appliance (e.g., when the door is in the closed position). For example, a user stands in front of the appliance to open a door and reaches into the internal chamber(s) to access items therein.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, or a drain cycle. The term "wash fluid" refers to a liquid used for washing or rinsing the articles and is typically made up of water that may include other additives such as detergent or other treatments.

Embodiments of the present disclosure include a housing that may be inside a cabinet that encases a component, such as a circuit board. In order to constrain the component into the housing, a tapered pin on a primary beam may be connected to the component. The pin and primary beam may act like a spring to install pin into a void within housing, the pin and primary beam flexing away from the void and then returning to their original position when the pin is inserted into the void. A skeletal support frame connected to or including the primary beam may aid the pin and primary beam in constraining the component in the housing.

Figure 2:
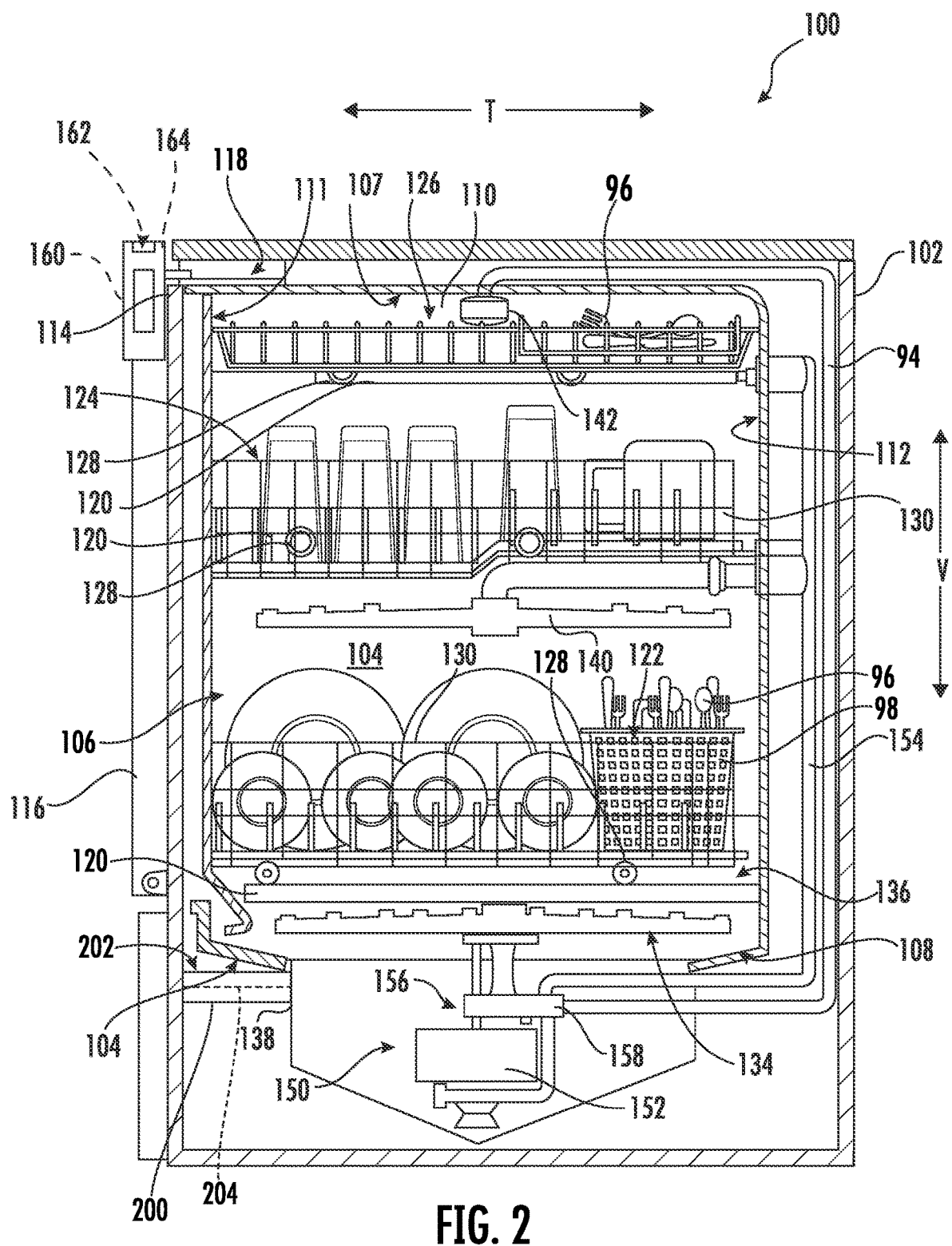
FIG. 2 provides a side, section view of the exemplary dishwasher appliance of FIG. 1.

As will be understood by those skilled in the art, dishwasher appliance 100 is provided by way of example only, and the present subject matter may be used in any suitable household appliance. Thus, the present subject matter may be used with other dishwasher appliances having different configurations. The present subject matter may further be used with other household appliances such as microwave ovens, washing machine appliances, dryer appliances, dishwashing appliances, refrigerator appliances, etc. Dishwasher appliance 100 will be described below, with the understanding that other embodiments may include or be provided as another suitable household appliance (e.g., defining an internal chamber). Referring now to the figures, an exemplary appliance will be described in accordance with exemplary aspects of the present subject matter. Specifically, FIG. 1 provides a perspective view of an exemplary domestic dishwasher appliance 100 and FIG. 2 provides a side cross-sectional view of appliance 100. As illustrated, appliance 100 generally defines a vertical direction V, a lateral direction L, and a transverse direction T, each of which is mutually perpendicular, such that an orthogonal coordinate system is generally defined.

According to exemplary embodiments, appliance 100 includes a cabinet 102 that is generally configured for containing and/or supporting various components of appliance 100 and which may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 107 and a bottom 108 along the vertical direction V, between a first side 109 (e.g., the left side when viewed from the front as in FIG. 1) and a second side 110 (e.g., the right side when viewed from the front as in FIG. 1) along the lateral direction L, and between a front 111 and a rear 112 along the transverse direction T. In general, terms such as "left," "right," "front," "rear," "top," or "bottom" are used with reference to the perspective of a user accessing appliance 100.

For the particular embodiment of FIGS. 1 and 2, the dishwasher 100 includes a cabinet 102 (FIG. 2) having a tub 104 therein that defines a wash chamber 106. As shown in FIG. 2, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom for movement between a normally closed vertical position (shown in FIG. 2), wherein the wash chamber 106 is sealed shut for washing operation, and a horizontal, fully open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

Figure 3:
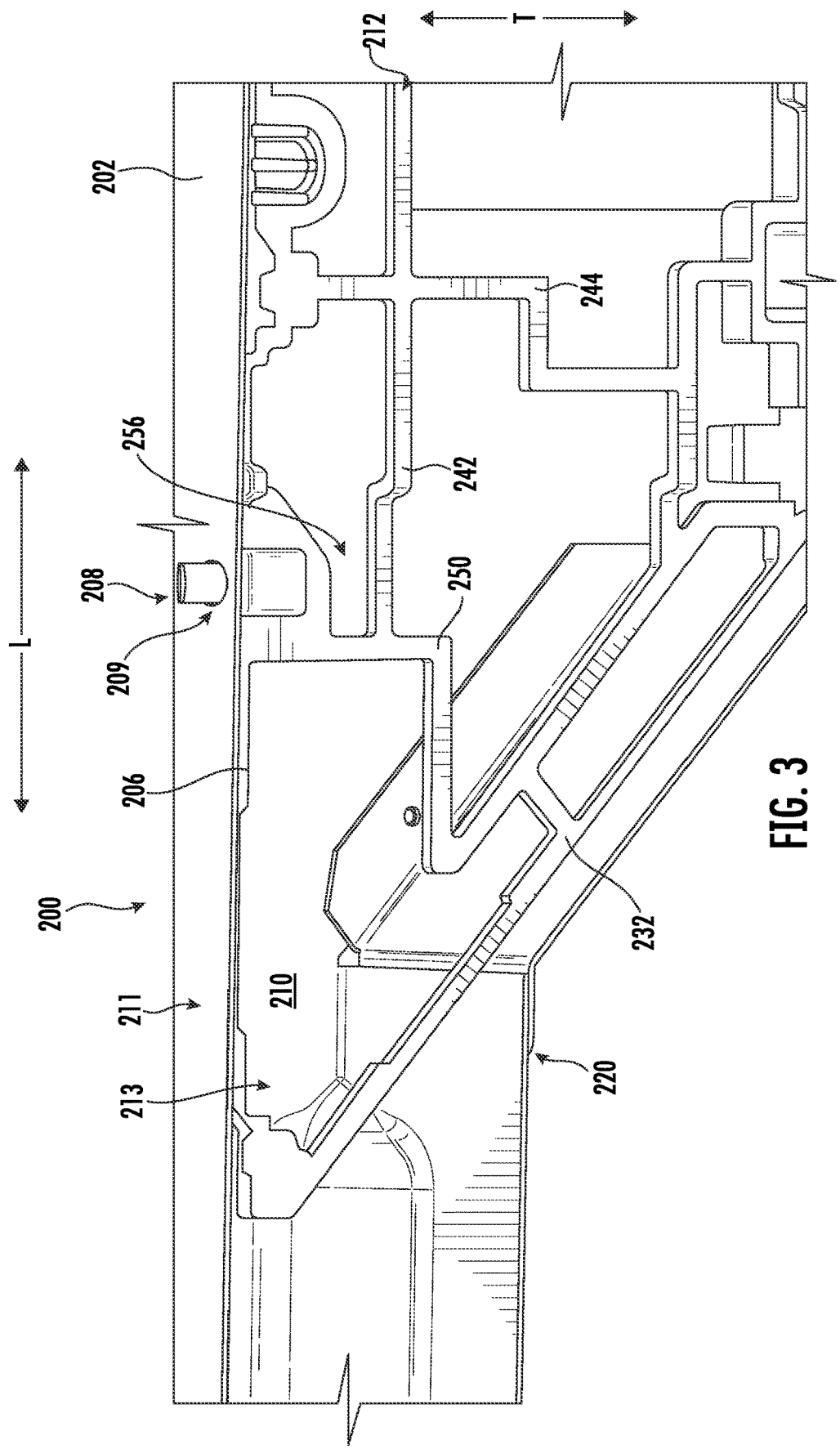
FIG. 3 provides a bottom perspective view of an embodiment of an exemplary housing in the exemplary dishwasher appliance of FIG. 1.

As best illustrated in FIGS. 2 and 3, tub side walls 110 accommodate a plurality of rack assemblies. More specifically, guide rails 120 may be mounted to side walls 110 for supporting a first rack assembly 122 (also referred to as a lower rack assembly 122), a middle rack assembly 124 (also referred to as a second rack assembly 124), and a third rack assembly 126 (also referred to as an upper rack assembly 126). As illustrated, third rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. For this embodiment, a silverware basket 98 is removably attached to a rack assembly, e.g., lower rack assembly 122, for placement of silverware 96, utensils, and the like, that are otherwise too small or delicate to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a first spray assembly 134 (also referred to as a lower spray arm assembly 134) disposed in a lower region 136 of wash chamber 106 and above a sump 138 so as to rotate in relatively close proximity to lower rack assembly 122. Similarly, a second spray assembly 140 (also referred to as a mid-level spray arm assembly 140) is located in an upper region of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, a third spray assembly 142 (also referred to as an upper spray assembly 142) may be located above third rack assembly 126 along the vertical direction V. In this manner, third spray assembly 142 may be configured for urging or cascading a flow of wash fluid downward over rack assemblies 122, 124, and 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to mid-level spray arm assembly 140 while a secondary supply conduit 94 supplies wash fluid to upper spray assembly 142. Diverter assembly 156 can allow selection between spray assemblies 134, 140 and 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray assemblies 134, 140, 142 may be motor-driven, or may operate using any other suitable drive mechanism. Spray manifolds and assemblies may also be stationary.

Movement of the spray arm assemblies 134 and 140 and the spray from fixed manifolds like spray assembly 142 provides coverage of dishes, silverware, and other dishwasher contents and articles to be cleaned with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156, e.g., which is positioned within sump 138 of dishwasher appliance. Diverter assembly 156 may include a diverter disk (not shown) disposed within a diverter chamber 158 for selectively distributing the wash fluid to the spray assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which (e.g., 94 and 154) are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counterclockwise direction, a third conduit for spraying rack assembly 126 (shown in FIGS. 2 and 3) as a silverware rack, and a fourth conduit for supplying only mid-level or upper spray assemblies 140, 142. Other configurations of diverter assembly 156 or other components (e.g., valves) may be used to allow various choices in the operation of the spray assemblies 134, 140, and 142 during a cleaning cycle.

The dishwasher 100 is further equipped with a controller 160 to regulate operation of the dishwasher 100. Controller 160 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of the dishwasher 100. In one embodiment, the user interface 164 may represent a general purpose I/O ("GPIO") device or functional block. In one embodiment, the user interface 164 may include input components, such as one or more of a variety of electrical, mechanical, or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

While dishwasher 100 is shown, it should be appreciated that the present disclosure is not limited to any particular appliance and could be used in any modular appliance or manufactured part, including washing machines, dryers, refrigerators, ovens, ranges, and any other component having circuitry that requires a housing for circuitry. For example, an apparatus with a bar and a circuit with housing may be provided. The exemplary embodiment depicted in FIGS. 1 and 2 is for illustrative purposes only. For example, an apparatus with a housing may be used, and other differences may be applied while remaining within the scope of the present subject matter.

Turning to FIGS. 2 through 9, an appliance housing 200 is generally provided. As shown in FIG. 2, housing 200 may be located below tub 104. Additionally or alternatively, housing 200 may be attached to or supported by cabinet 102. In some embodiments, housing 200 is located internal to cabinet 102, in another location than that shown in FIG. 2.

For the remainder of the description, and as shown in FIGS. 2 through 9, directions, including lateral, transverse, and vertical directions, will hereinafter be given in relation to housing 200, which is shown in an exemplary position in dishwasher 100 in FIG. 2 as attached below tub 104. As shown in FIG. 3, lateral, vertical, and transverse directions are hereinafter defined by housing 200. The alignment of these directions as defined by housing 200, may align with or be parallel to the exemplary position of housing 200 in FIG. 2 (where L, V, and T directions are defined relative to dishwasher 100), for clarity of description herein. The position of housing 200 in dishwasher 100 is shown in FIG. 2 for exemplary purposes and for ease in defining directions only; housing 200 could be placed in any number of positions or alignments within dishwasher 100 or, indeed, in any household appliance requiring a modular housing 200 as described herein.

Turning to FIGS. 2 and 3, housing 200 may generally include a mating component 202, a confined component 204, a primary beam 206, and a pin 208 attached to primary beam 206. In some embodiments, housing 200 encases a circuitry member of appliance 100, such as a control panel or another circuit board. In certain embodiments, circuitry is connected via a connector wire from housing 200 (not shown). In additional or alternative embodiments, controller 160 includes, is provided as, or is otherwise in operative communication with circuitry member encased by housing 200.

When assembled, mating component 202 is generally adjacent to primary beam 206 or confined component 204. As shown in FIG. 3, mating component 202 may surround at least a portion of primary beam 206 and confined component 204. When assembled, mating component 202, as shown in FIG. 2, may be located with a top 210 vertically above confined component 204, beam 206, and pin 208. In some embodiments, mating component 202 includes a top 210 and a front side section 211. Top 210 may be attached to front side section 211. In some embodiments, front side section 211 is orthogonal to and extends vertically below top 210. Mating component 202 defines an interior volume 213 and an opening 209. Top 210 and front side section 211 may define interior volume 213. Additionally or alternatively, front side section 211 may define opening 209. In some embodiments, opening 209 may extend through front side section 211 allowing access to interior volume 213. For instance, pin 208 may be inserted from interior volume 213 through front side section 211 at opening 209. In some embodiments, mating component 202 selectively encases confined component 204 and primary beam 206. Mating component 202 is constrained with beam 206 and pin 208 when housing 200 is in an original position 220.

Figure 4:
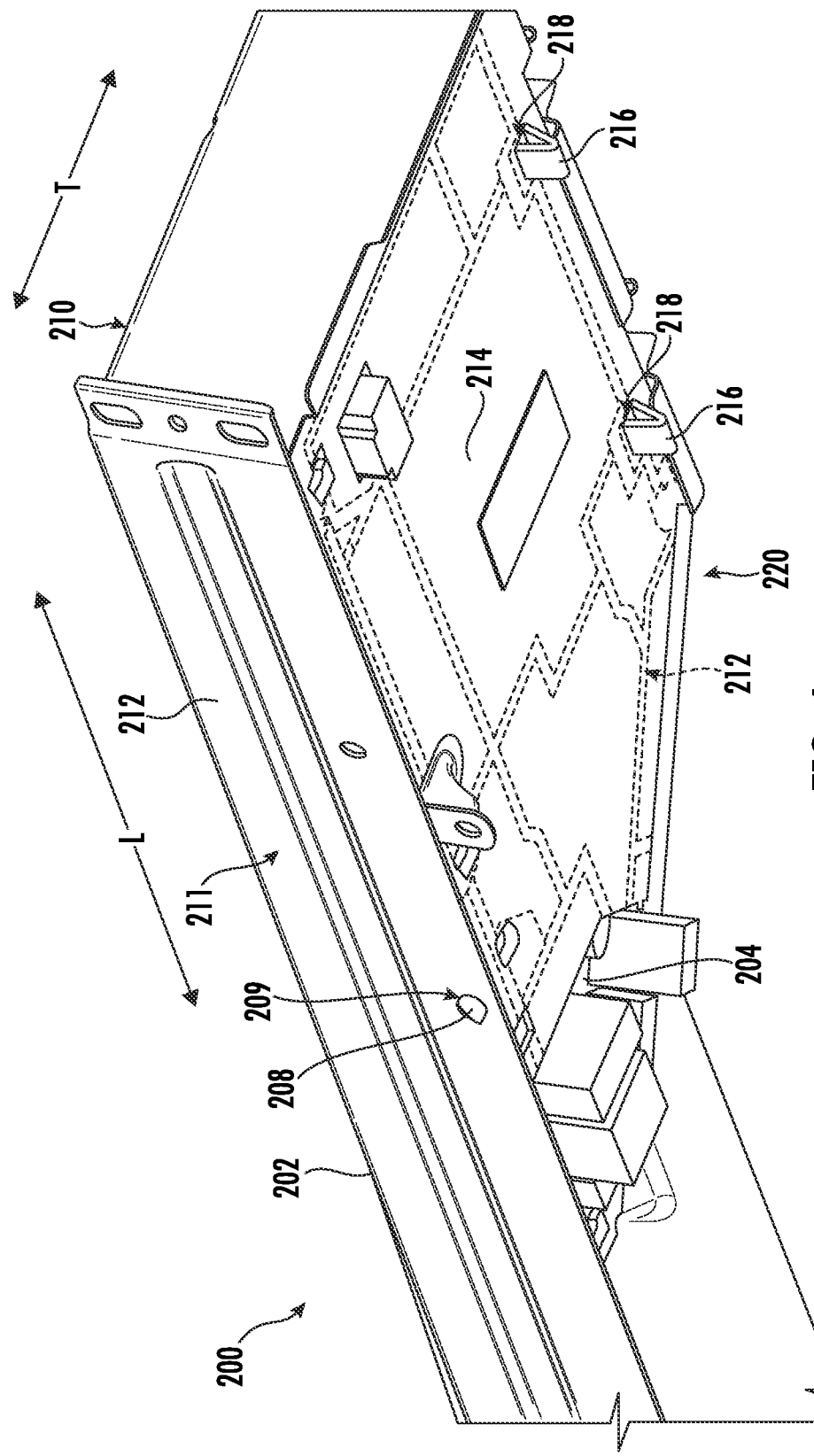
FIG. 4 provides a bottom perspective view of the exemplary housing of FIG. 3.

Turning generally to FIGS. 3 and 4, opening 209 is defined by mating component 202. As shown, opening 209 is further defined by front panel 258, with opening 209 allowing pin 208 to extend transversely through front panel 258 at opening 209.

Pin 208 extends through opening 209, constraining primary beam 206 in original position 220. Additionally or alternatively, pin 208 is aligned with opening 209 to constrain confined component 204 relative to mating component 202. In some embodiments, pin 208 extending through opening 209 further constrains confined component 204. In certain embodiments, pin 208 extending through opening 209 further constrains skeletal support frame 212, confined component 204, and mating component 202 together in original position 220. As shown in FIG. 4, pin 208 constrains backing panel 214 in addition to skeletal support frame 212, confined component 204, and mating component 202 in original position 220.

When assembled, confined component 204 may be attached to or supported by mating component 202. In some embodiments, confined component 204 may be is covered by mating component 202. For example, when installed, confined component 204 may be below top 210 and behind front side section 211. Confined component 204 may be located within interior volume 213. In some embodiments, confined component 204 is removably connected to mating component 202. For example, confined component 204 may be connected to primary beam 206 (e.g., by way of clips 216) and pin 208. In particular, pin 208 may be inserted at opening 209 and may be removable therefrom. As desired (e.g., for assembly or service), confined component 204 may be removed from mating component 202 with removal of pin 208 from opening 209 of mating component 202.

In certain embodiments, pin 208 or beam 206 is/are attached or give support to confined component 204. For example, when assembled (e.g., when installed in housing 200), pin 208 may be inserted through opening 209 and constrained in that position by primary beam 206 or skeletal support frame 212. Therefore, generally, pin 208 may constrain confined component 204. Additionally or alternatively, confined component 204 may be constrained by beam 206 attached to pin 208. Confined component 204 may be connected or attached to beam 206 or pin 208 (e.g., in combination with primary beam 206). When installed in housing 200, primary beam 206 may constrain confined component 204 in housing 200. In some embodiments, beam 206 is attached to or included with a skeletal support frame 212. Skeletal support frame 212 may constrain, or aid in constraining, confined component 204 (e.g., in addition to the support or constraint provided by primary beam 206). For example, as shown in FIG. 4, skeletal support frame 212 may support confined component 204 by being located vertically below confined component 204 within mating component 202. Skeletal support frame 212 may extend across at least a portion of confined component 204, constraining confined component 204 above skeletal support frame 212. In some such embodiments, pin 208 may constrain skeletal support frame 212 as described above, and thus, pin 208 may additionally or alternatively constrain confined component 204 by such connection.

Separate from or in addition to the support from pin 208 or beam 206, in some embodiments, confined component 204 in encased by mating component 202. For instance, as shown in FIG. 4, confined component 204 may be internal to mating component 202, confined below mating component top 210 and behind front side section 211. In additional or alternative embodiments, a backing panel 214 aids mating component 202 in encasing confined component 204, backing panel 214 indirectly constrained by pin 208. As shown in FIG. 4, pin 208 is connected to skeletal support frame 212, and skeletal support frame 212 is connected to backing panel 214 (e.g., via one or more clips 216—described below). In turn, backing panel 214 may be indirectly constrained by pin 208. In alternate embodiments, pin 208 and beam 206 may be integral (e.g., formed as a unitary monolith) with backing panel 214 and may directly constrain backing panel 214. As shown in FIG. 4, backing panel 214 may be disposed vertically below pin 208, skeletal support frame 212, and confined component 204, and may be connected to beam 206 and pin 208, as described below. Backing panel 214 may be a bottom surface in appliance housing 200 opposite to mating component top 210, enclosing confined component 204 therebetween.

Continuing with the embodiment shown in FIG. 4, appliance housing 200 may include a backing panel 214 that is constrained within mating component 202. In some such embodiments, beam 206 and pin 208 are attached to backing panel 214 and constrain backing panel 214 within mating component 202. Optionally, backing panel 214 is attached to skeletal support frame 212 with a set of clips 216 on skeletal support frame 212. Additionally or alternatively, backing panel 214 may define a set of clip openings 218. In some embodiments, clips 216 attach skeletal support frame 212 to backing panel 214 through clip openings 218. As skeletal support frame 212 is attached to pin 208 and backing panel 214 is attached to skeletal support frame 212, pin 208 may constrain backing panel 214 into mating component 202. In some embodiments, skeletal support frame 212 is attached to backing panel 214 by other methods including glue, snaps, or friction fit type attachment methods as known in the art. In the orientation shown in FIG. 2, backing panel 214 is vertically below confined component 204, primary beam 206, and pin 208. Without being constrained by pin 208, backing panel 214 may fall out of mating component 202 in some embodiments including the embodiment shown in FIG. 2.

Turning to FIGS. 5 through 10, primary beam 206 is attached to pin 208. For instance, pin 208 may be joined to primary beam 206 (e.g., as an integral unitary member therewith) and extend transversely outward or forward from primary beam 206. In some embodiments, primary beam 206 is attached to pin 208 behind pin 208 and extends orthogonally in either direction from pin 208. For instance, primary beam 206 may extend laterally behind front side section 211, with pin 208 attached to or extending from a side of primary beam 206 that faces front side section 211. In some embodiments, pin 208 attaches to a forward surface of primary beam 206, and primary beam 206 extends (e.g., lengthwise) behind pin 208.

Figure 5:
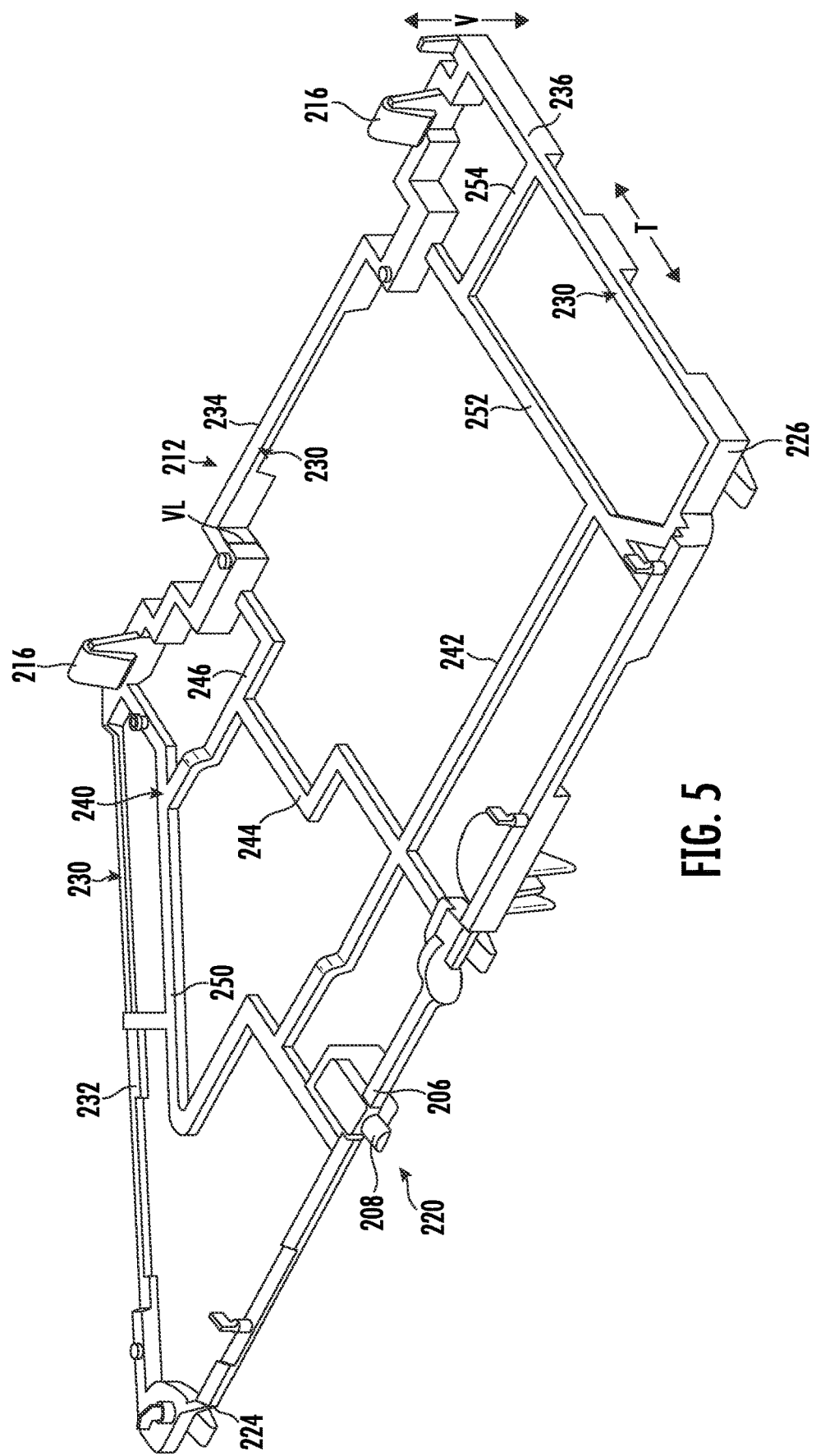
FIG. 5 provides a bottom perspective view of an exemplary skeletal support frame according to exemplary embodiments of the present disclosure.

Generally, primary beam 206 includes or is provided as a bar that extends lengthwise. The length of primary beam 206 may be flexible in a spring like fashion, thereby returning to an equilibrium or original position 220 (e.g., when not being acted upon by an outside force apart from gravity). In some embodiments, primary beam 206 includes a first fixed beam end 224 and a second fixed beam end 226. Primary beam 206 may thus extend (e.g., laterally, or lengthwise) between first fixed beam end 224 and second fixed beam end 226. In some embodiments, primary beam 206 is attached to or included skeletal support frame 212. For example, primary beam 206 may attach (e.g., fixedly attach) to skeletal support frame 212 at first beam end 224 and a second beam end 226. In certain embodiments, primary beam 206 runs along an exterior side of skeletal support frame 212. For example, primary beam 206 may run along a transversely forward side of skeletal support frame 212, as shown in FIG. 5.

Figure 10:
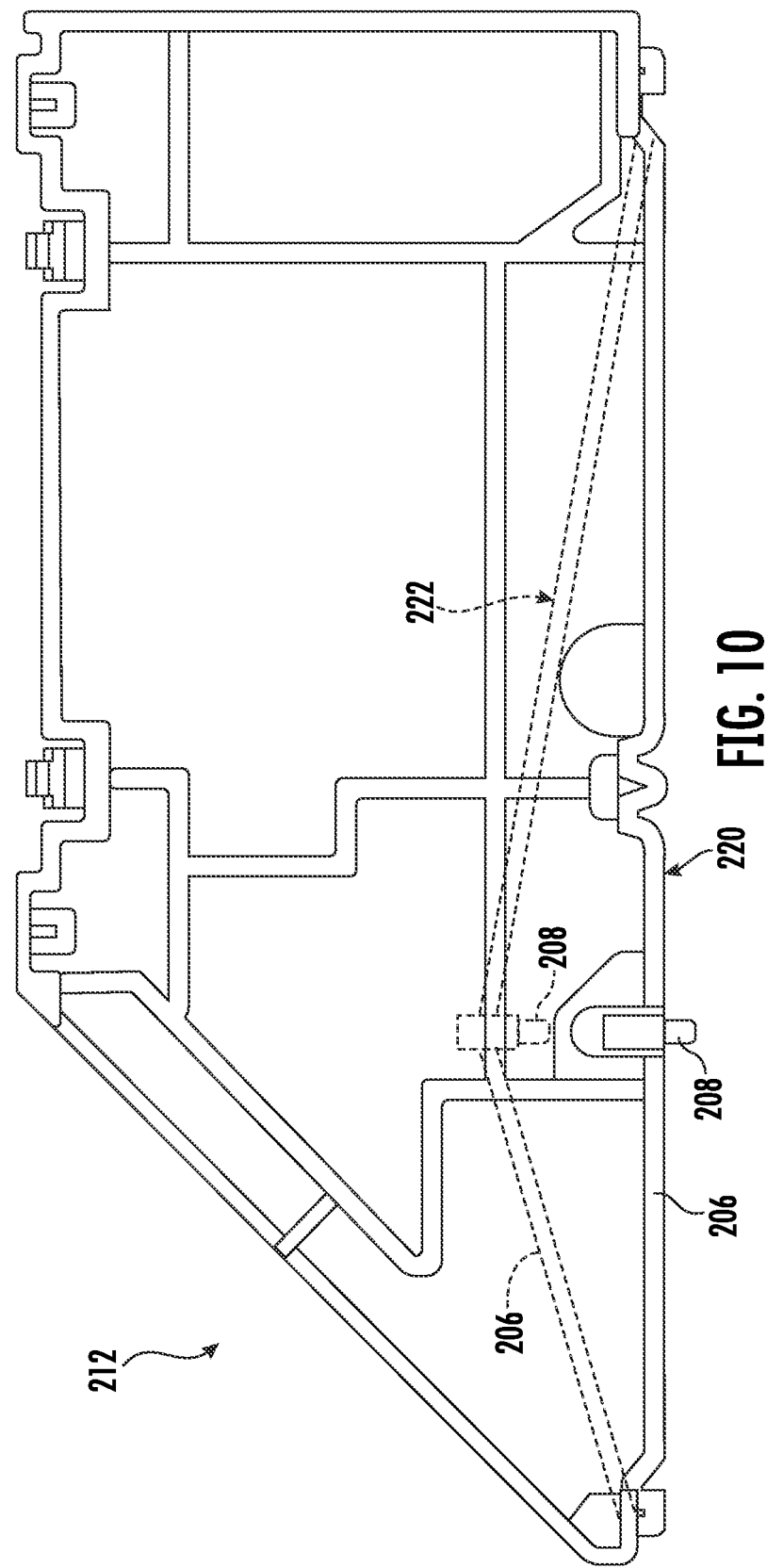
FIG. 10 provides a top elevation view of the exemplary skeletal support frame of FIG. 5.

When assembled, primary beam 206 may be elastically movable relative to mating component 202. For instance, primary beam 206 may flex with pin 208 during installation of beam 206 into housing 200. In particular, primary beam 206 may be movable between an original (e.g., equilibrium) position 220 and a flexed position 222 (as shown in FIG. 10). As shown in FIG. 5, primary beam 206 extends laterally along a transversely front end of skeletal support frame 212 in original position 220. Additionally or alternatively, in original position 220, pin 208 may extend transversely and orthogonally in front of primary beam 206.

In flexed position 222, primary beam 206 may extend laterally and transversely (e.g., to form a bowed arc), thereby flexing (e.g., held in a flexed state) behind pin 208. In some embodiments, when moving from original position 220 to flexed position 222, primary beam 206 flexes behind pin 208, extending transversely behind and curving as pin 208 moves toward flexed position 222. In some embodiments, flexed position 222 includes pin 208 held in or moved into a space that primary beam 206 occupies when primary beam 206 is in original position 220. In the illustrated embodiment of FIG. 10, primary beam 206 is held or deflected transversely backward from original position 220 (FIG. 5) when in flexed position 222.

As noted above, primary beam 206 may extend (e.g., laterally) between first fixed beam end 224 and second fixed beam end 226. The positions of first fixed beam end 224 and second fixed beam end 226 generally remain stationary (e.g., relative to skeletal support frame 212) when primary beam 206 is in original position 220 and when primary beam 206 is in flexed position 222. In the illustrated embodiment, first fixed beam end 224 and second fixed beam end 226 are attached to skeletal support frame 212. According to the arrangement, first fixed beam end 224 and second fixed beam end 226 are attached to a plurality of interconnected beams 230 (e.g., included with skeletal support frame 212, as will be described in detail below).

In some embodiments, housing 200 includes skeletal support frame 212. As shown, skeletal support frame 212 is attached to primary beam 206. In some embodiments, skeletal support frame 212 is attached to primary beam 206 at first fixed beam end 224 and at second fixed beam end 226. In additional or alternative embodiments, skeletal support frame 212 is disposed between mating component 202 and backing panel 214 (e.g., along the vertical direction V). During use, skeletal support frame 212 may aid primary beam 206 in constraining confined component 204 with pin 208 in mating component 202. As shown in FIG. 4, skeletal support frame 212 may be vertically sandwiched between confined component 204 and backing panel 214. As shown in FIG. 3, skeletal support frame 212 may be vertically below mating component 202 and confined component 204.

Returning generally to FIGS. 5 through 10, skeletal support frame 212 includes a plurality of interconnected perimeter beams 230 attached to primary beam 206. In some embodiments, plurality of perimeter beams 230 are stationary relative to primary beam 206 between flexed position 222 and original position 220. Additionally or alternatively, skeletal support frame 212 may aid primary beam 206 in constraining confined component 204 with the use of interconnected perimeter beams 230. As shown, pin 208 may be transversely in front of skeletal support frame 212 in original position 220. Additionally or alternatively, in the original position, pin 208 may constrain skeletal support frame 212 (e.g., relative to mating component 202).

In additional or alternative embodiments, plurality of interconnected perimeter beams 230 may form a frame supporting primary beam 206 and pin 208. As shown in FIG. 5, plurality of interconnected perimeter beams 230 may include first perimeter beam 232, second perimeter beam 234, or third perimeter beam 236. First perimeter beam 232 may be attached to primary beam 206 (e.g., at first fixed beam end 224). Third perimeter beam 236 may be attached to primary beam 206 (e.g., at second fixed beam end 226). Second perimeter beam 235 may be attached to first perimeter beam 233 and third perimeter beam 236. During use, interconnected perimeter beams 230 may constrain primary beam 206 and pin 208 in mating component 202 in original position 220. In some embodiments, interconnected perimeter beams 230 are stationary relative to primary beam 206 between flexed position 222 and original position 220. Interconnected perimeter beams 230 may aid primary beam 206 in performing a spring like action between flexed position 222 and original position 220. In some embodiments, primary beam 206 flexes from original position 220 into flexed position 222 to install into mating component 202 and returns to original position 220 upon completion of installation, primary beam 206 constrained in mating component 202 with interconnected perimeter beams 230.

In some embodiments, clips 216 are connected to interconnected perimeter beams 230. As shown in FIG. 5, clips may be attached at either lateral end of second perimeter beam 234. More or less clips in set of clips 216 than shown in FIG. 5 may be present in different embodiments.

Though plurality of interconnected perimeter beams 230 are shown with primary beam 206 to form a trapezoid type of shape, embodiments may also have another shape, such as a rectangular shape, triangular shape, or another shape, including amorphous shapes. More or less members may be present in plurality of interconnected perimeter beams 230 than are shown in FIGS. 5 through 9 in certain embodiments. Generally, plurality of interconnected perimeter beams 230 form a perimeter for skeletal support frame 212 and aid in constraining components as described herein.

Additionally or alternatively, skeletal support frame 212 may include a plurality of interior beams 240 (e.g., individual beams 242, 244, 246, 248, 250, 252, 254). Interior beams 240 may be internal in relation to interconnected perimeter beams 230 and primary beam 206. In some embodiments, interior beams 240 form a grid attached to interconnected perimeter beams 230. During use, interior beams 240 may be attached to interconnected perimeter beams 230 to constrain confined component 204, skeletal support frame 212, and mating component 202. In certain embodiments, interior beams 240, such as interior beams 244, 250 may attach to primary beam 206.

As shown in FIG. 5, interior beams 240 may include a plurality of individual beams (e.g., beams 242, 244, 246, 248, 250, 252, 254). Individual beams included in plurality of interior beams 240 may be straight members or bent members with different geometries, including "T," "C," and "V" shaped members. The shape of individual members in plurality of interior beams 240 may be different for different embodiments. In some embodiments, interior beams 240 support primary beam 206 in having a spring action during movement between original position 220 and flexed position 222. In some embodiments, interior beams 240 are in a flexed arrangement with primary beam 206 within skeletal support frame 212 when primary beam 206 is in flexed position 222. Additionally or alternatively, interior beams 240 may aid in constraining pin 208 within opening 209. Interior beams 240 may add support pressure to primary beam 206, constraining pin 208 in opening 209 when pin 208 is installed within mating component 202.

Although interior beams 240 are shown in FIGS. 5 through 9 with a specific geometry, alternate geometries of interior beams 240 may be useful in alternate embodiments to aid in spring-type movement of primary beam 206 and to constrain pin 208 in opening 209 when pin is installed in appliance housing 200.

Additionally or alternatively, plurality of interior beams 240 may include one or more mutually orthogonal beams. For example, interior beam 252 is orthogonal to interior beam 254 in FIG. 5. In some embodiments, one or more interior beams of plurality of interior beams 240 are roughly orthogonal to primary beam 206. For example, interior beam 252 is orthogonal to primary beam 206 and to interior beam 254. Similarly, for example, interior beam 244 is orthogonal to primary beam 206 and to interior beam 246. In turn, beam 250 is orthogonal to primary beam 206 and to interior beam 242. In some embodiments, one or more interior beams 240 of plurality of interior beams 240 are roughly orthogonal to primary beam 206. In certain embodiments, plurality of interior beams 240 includes two or more mutually orthogonal beams.

Figure 6:
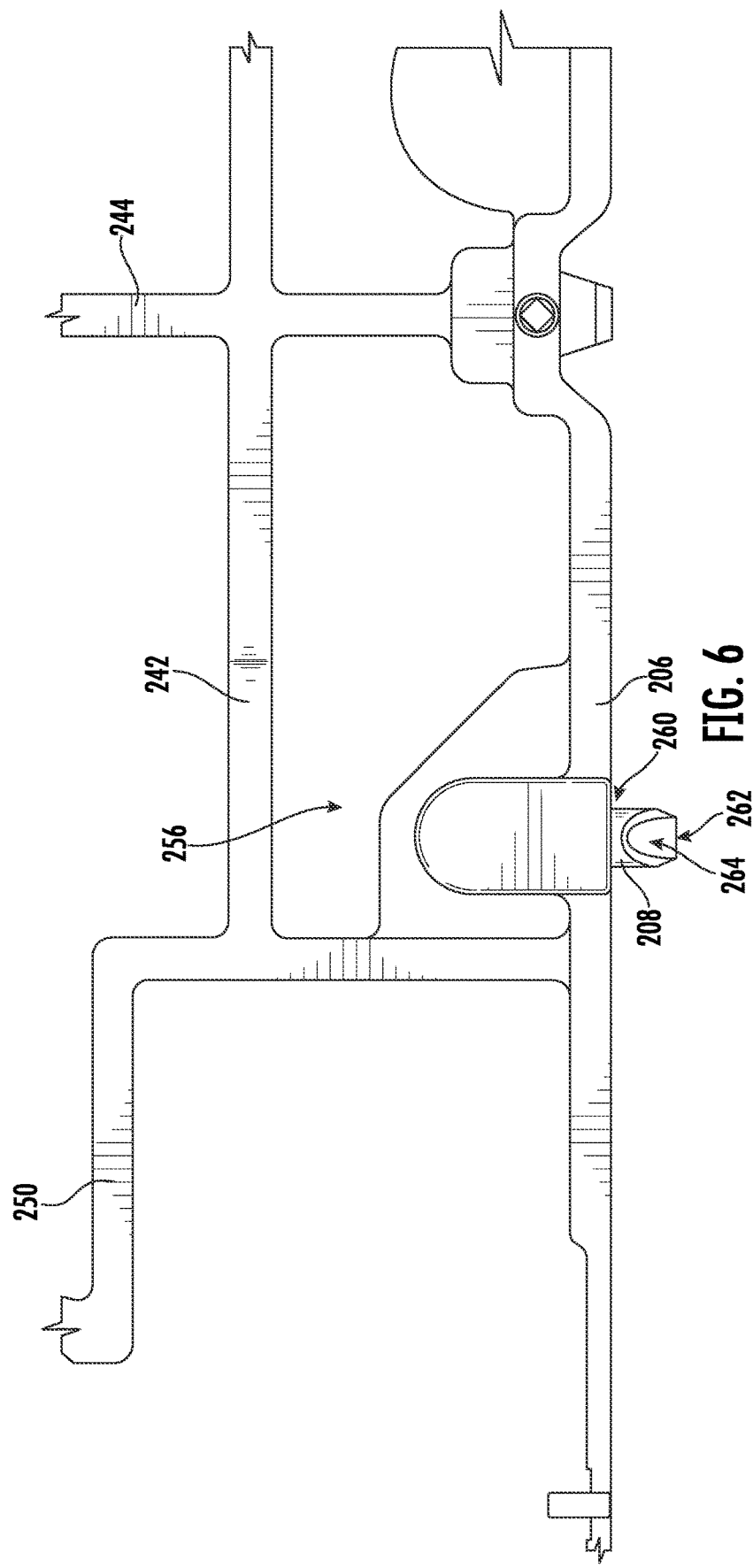
FIG. 6 provides a top elevation view of a section of the exemplary skeletal support frame of FIG. 5.

As shown in FIGS. 5 and 6, skeletal support frame 212 defines a deformation void 256 behind primary beam 206. Generally, deformation void 256 is directly behind pin 208. In the illustrated embodiments, deformation void 256 is transversely behind pin 208. Additionally or alternatively, deformation void 256 is directly behind opening 209 defined on mating component 202 (e.g., when pin 208 is installed therein). In some embodiments, when in flexed position 222, primary beam 206 is rearward from original position 220 toward deformation void 256. In certain embodiments, when in flexed position 222, pin 208 is also rearward from original position 220 toward deformation void 256. For instance, pin 208 may be flexed in a transversely rearward position relative to original position 220 when in flexed position 222, and deformation void 256 may be squeezed or have a smaller volume when in flexed position 222 as a result of primary beam 206 and pin 208 flexing backwards from original position 220 to flexed position 222.

In some embodiments, skeletal support frame 212, primary beam 206 and pin 208 are aligned within a plane having two directions. As shown in FIG. 5, alignment within a plane includes a rough alignment in the transverse and lateral directions. In some embodiments, alignment within a plane includes alignment in two directions (for example transverse and lateral directions) within a vertical space VL defined by a vertical height of interconnected perimeter beams. Minor vertical inconsistencies, such as those seen with interior beams 242 and 246 are included within the concept of "alignment within a plane" as described herein.

As previously described, pin 208 is attached to primary beam 206 to move therewith between flexed position 222 and original position 220. As shown, pin 208 is located in front of primary beam 206. Generally, when installed, pin 208 is located through opening 209, and in front of a front panel 258 of mating component 202. In some embodiments, pin 208 is further located in front of skeletal support frame 212, confined component 204 and backing panel 214.

Figure 7:
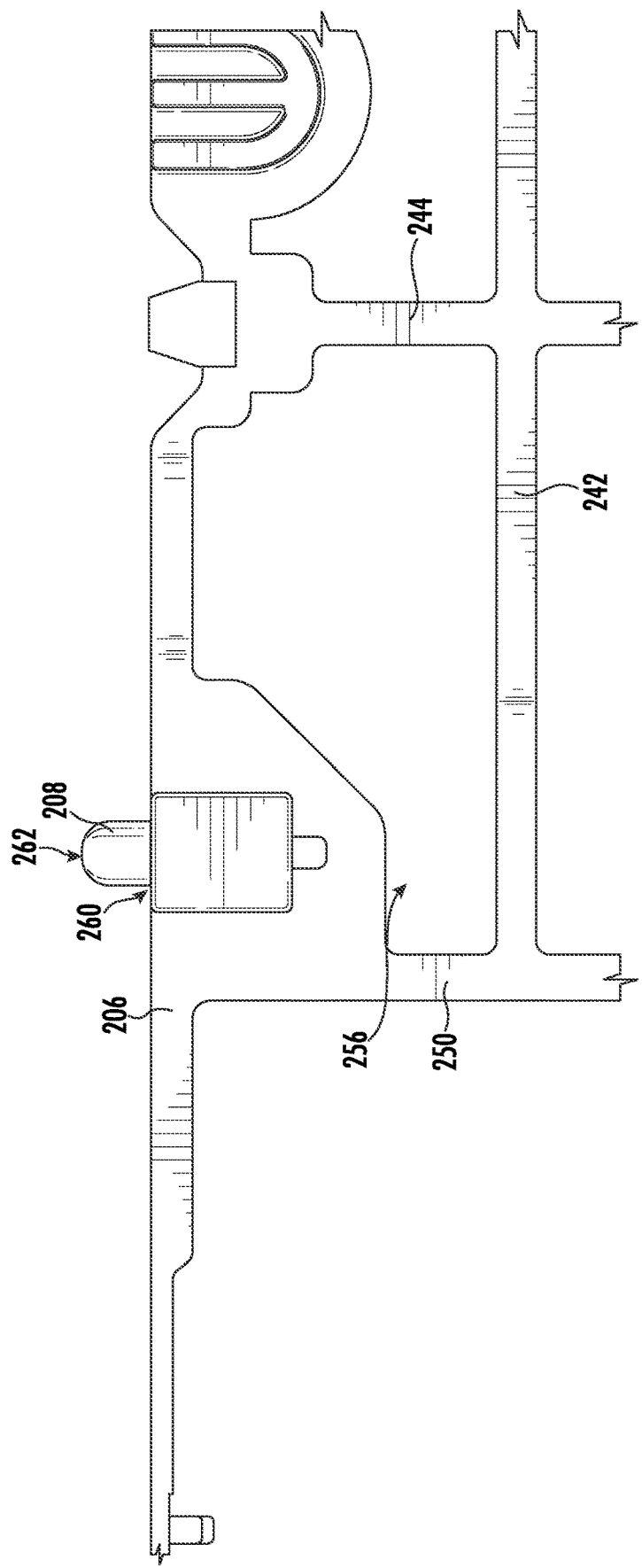
FIG. 7 provides a bottom elevation view of a section of the exemplary skeletal support frame of FIG. 5.
Figure 8:
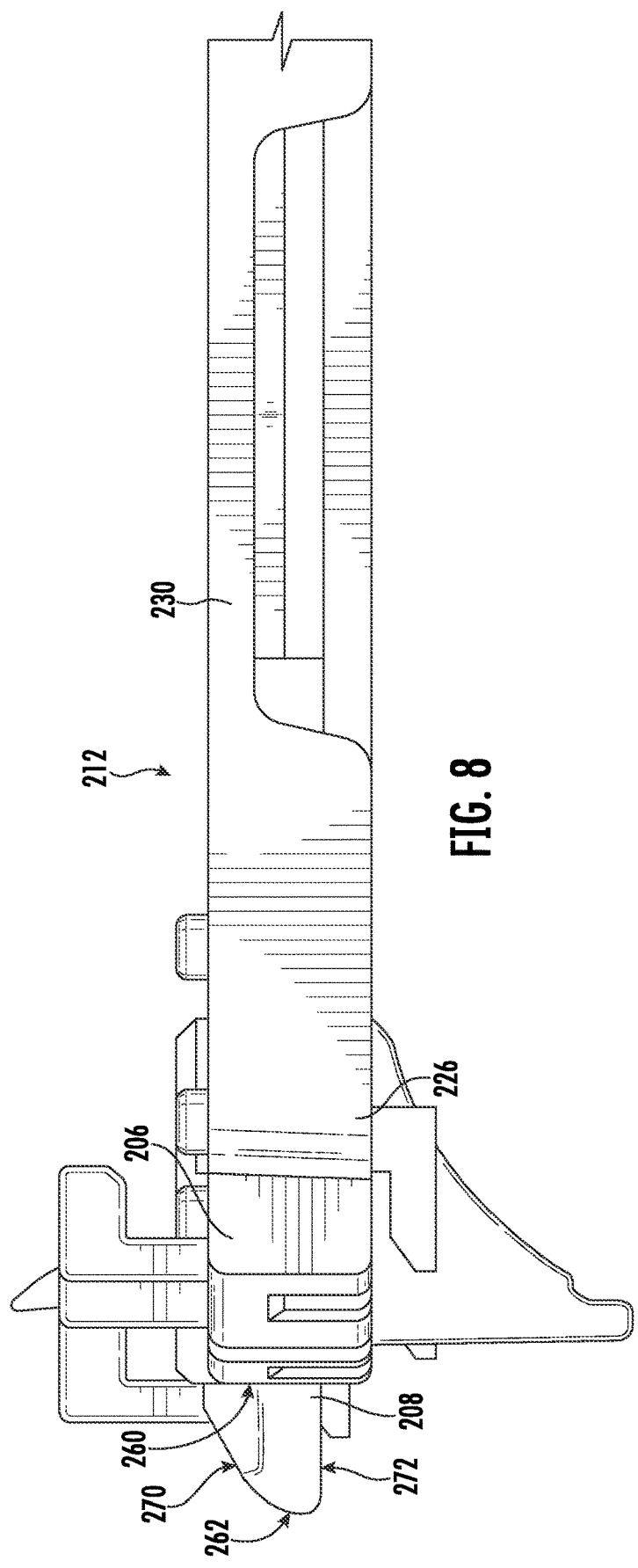
FIG. 8 provides a perspective view of a section of the exemplary skeletal support frame of FIG. 5.

As shown in FIGS. 6, 7, and 8, pin 208 includes a base end 260 and an outer end 262. In some embodiments, pin 208 further includes a taper 264. Pin 208 extends from base end 260 proximal to primary beam 206 and outer end 262 distal to primary beam 206. In some embodiments, taper 264 on pin 208 extends from base end 260 to outer end 262, such that outer end 262 is smaller than base end 260. For instance, outer end 262 of pin 208 is smaller in a cross-sectional space having lateral and vertical direction when compared to base end 260 in a similar cross-sectional space having lateral and vertical direction, as shown in FIG. 8. In some embodiments, taper 264 runs along an upper portion of pin 208 (i.e., taper 264 extends from outer end 262 towards base end 260 along a portion of pin 208 that faces vertically upward). Thus, taper 264 is generally visible in the top view of FIG. 6 and not visible in the bottom view of skeletal support frame 212 shown in FIG. 7.

Additionally or alternatively, pin 208 and primary beam 206 may be a unitary component of appliance 100. In some embodiments, skeletal support frame 212 is also unitary with primary beam 206 and pin 208. In certain embodiments, plurality of interconnected perimeter beams 230 and plurality of interior beams 240 are unitary with pin 208 and beam 206. Unitary elements attached to pin 208 and including pin 208, may be made of a slightly flexible material, such as plastics, or of equivalent materials as known in the art. Beam 206 and pin 208 may be made of materials that allow beam 206 to flex between original position 220 and flexed position 222 and also constrain confined component 204 within mating component 202 when installed in appliance housing 200.

Figure 9:
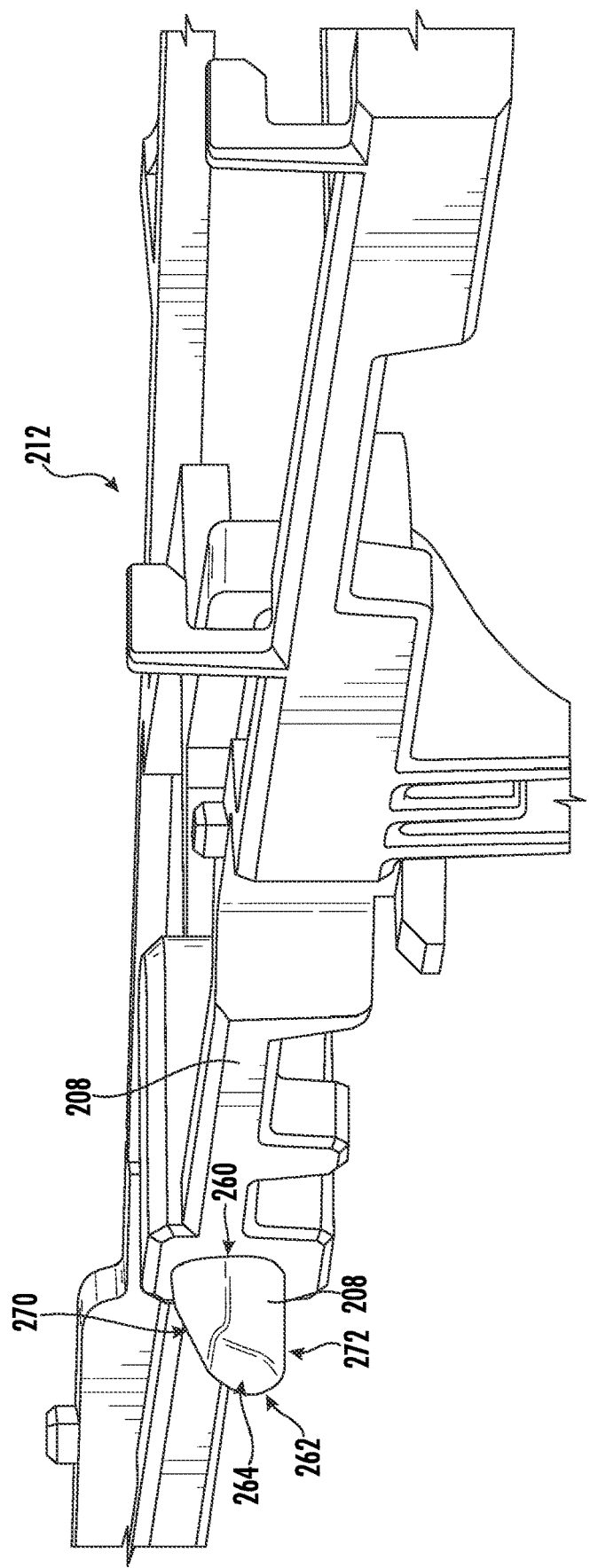
FIG. 9 provides an alternative perspective view of a section of the exemplary skeletal support frame of FIG. 8.

As shown in FIGS. 8 and 9, pin 208 includes a tapered side 270 and an untapered side 272. In some embodiments, tapered side 270 is directed upward to engage mating component 202 before untapered side 272 of pin 208 during installation. As such, tapered side 270 is aligned to face towards opening 209 when pin 208 and beam 206 are in flexed position 222. In the embodiments shown in FIG. 5, tapered side 270 faces vertically upward, and untapered side 272 faces vertically downward. In some embodiments, with pin 208 installed in mating component 202 and extended through opening 209, tapered side 270 faces away from backing panel 214. In additional or alternate embodiments, tapered side 270 may face a different way (such as vertically downward, or to a lateral side), with tapered side 270 aligned to face toward opening 209 during assembly of pin 208 into opening 209.

Generally, FIG. 10 shows skeletal support frame 212 with primary beam 206 and pin 208, in original position 220 with flexed position 222 shown as an alternate position (dashed lines). Other figures, (e.g., FIGS. 3 through 9) depict modular housing 200 or a subset of modular housing 200 in original position 220. As shown in FIG. 10, movement between flexed position 222 and original position 220 includes movement by pin 208 and primary beam 206. Primary beam 206 is flexible to allow pin 208 to move inward in a first direction (e.g., transversely) from original position 220 to flexed position 222. Thus, primary beam 206 and pin 208 have a spring like movement between original position 220 and flexed position 222. Furthermore, primary beam 206 is flexible to allow pin to move inward in a first direction to flexed position 222 and return outward in a direction opposite to the first direction to original position 220. For example, when primary beam 206 is uninstalled in appliance housing 200, primary beam 206 may be in original position 220 (as shown in FIG. 5). During installation, primary beam 206 may flex to allow pin 208 to move inward in a first direction (e.g., transversely inward towards rear side 112 of appliance 100) from original position 220 to flexed position 222. In flexed position 222, primary beam 206 may be in a position that is flexed backwards relative to original position 220 of primary beam 206 (e.g., toward deformation void 256). In some embodiments, pin 208 in flexed position 222 can be positioned backwards such that pin 208 in flexed position 222 occupies the same general area of beam 206 when beam 206 is in original position 220. Once pin 208 is inserted through opening 209, pin 208 and beam 206 spring back from flexed position 222 to original position 220. Insertion of pin 208 through opening 209 may complete installation of pin 208 and primary beam 206 in housing 200. Additionally or alternatively, when pin 208 extends through opening 209, primary beam 206 flexes to allow pin 208 to return outward in a direction opposite to the first direction (e.g., transversely towards front side 111 of appliance 100) to original position 220, completing installation of pin 208 into housing 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance housing comprising:
    a mating component defining an opening;

a confined component removably connected to the mating component;
a primary beam, the primary beam being elastically movable relative to the mating component; and
a pin attached to the primary beam to move therewith between a flexed position and an original position, the pin extending from a base end proximal to the primary beam and an outer end distal to the primary beam, the pin being selectively received within the opening to constrain the primary beam relative to the mating component,
wherein the primary beam is flexible to allow the pin to move inward in a first direction to the flexed position and return outward in a direction opposite to the first direction to the original position,
wherein the appliance housing further comprises a skeletal support frame, the skeletal support frame being attached to the primary beam,
wherein the skeletal support frame comprises a plurality of interconnected perimeter beams attached to the primary beam,
wherein the plurality of interconnected perimeter beams are stationary relative to the primary beam between the flexed position and the original position,
wherein the primary beam extends between a first fixed beam end and a second fixed beam end, and
wherein the first fixed beam end and the second fixed beam end are attached to the plurality of interconnected perimeter beams.

2. The appliance housing of claim 1, wherein the pin is tapered from the base end to the outer end, such that the outer end is smaller than the base end.

3. The appliance housing of claim 1, wherein the skeletal support frame further comprises a plurality of interior beams, and
wherein the plurality of interior beams form a grid attached to the interconnected perimeter beams to constrain the confined component, the skeletal support frame, and the mating component.

4. The appliance housing of claim 3, wherein the plurality of interior beams comprises two or more mutually orthogonal beams,
wherein one or more interior beams of the plurality of interior beams are roughly orthogonal to the primary beam.

5. The appliance housing of claim 1, wherein the primary beam and the pin are a unitary component of the appliance.

6. The appliance housing of claim 1, wherein the primary beam, the pin, and the skeletal support frame are aligned within a plane having two directions.

7. The appliance housing of claim 1, wherein the skeletal support frame defines a deformation void behind the primary beam, and
wherein the flexed position includes the primary beam rearward from the original position toward the deformation void.

8. The appliance housing of claim 1, wherein the pin comprises a tapered side and an untapered side, and
wherein the tapered side is directed upward to engage the mating component before the untapered side of the pin during installation.

9. The appliance housing of claim 1, wherein the pin constrains the skeletal support frame, the confined component, and the mating component together in the original position.

10. The appliance housing of claim 9, wherein the appliance housing further comprises a backing panel, and
wherein the pin constrains the backing panel in addition to the skeletal support frame, the confined component, and the mating component in the original position.

11. An appliance comprising:
a cabinet;
a housing enclosed by the cabinet, the housing comprising:
a mating component defining an opening;
a confined component removably connected to the mating component;
a primary beam, the primary beam being elastically movable relative to the mating component; and
a pin attached to the primary beam to move therewith between a flexed position and an original position, the pin extending from a base end proximal to the primary beam and an outer end distal to the primary beam, the pin being selectively received within the opening to constrain the primary beam relative to the mating component,
wherein the primary beam is flexible to allow the pin to move inward in a first direction to the flexed position and return outward in a direction opposite to the first direction to the original position,
wherein the pin is aligned with the opening defined by the mating component to constrain the confined component relative to the mating component,
wherein the housing further comprises a skeletal support frame, the skeletal support frame attached to the primary beam,
wherein the skeletal support frame comprises a plurality of interconnected perimeter beams attached to the primary beam,
wherein the plurality of interconnected perimeter beams are stationary relative to the primary beam between the flexed position and the original position,
wherein the skeletal support frame further comprises a plurality of interior beams, and
wherein the plurality of interior beams form a grid attached and the interconnected perimeter beams to constrain the confined component, the skeletal support frame, and the mating component.

12. The appliance of claim 11, wherein the pin is tapered from the base end to the outer end, such that the outer end is smaller than the base end.

13. An appliance housing comprising:
a mating component defining an opening;
a confined component removably connected to the mating component;
a primary beam, the primary beam being elastically movable relative to the mating component; and
a pin attached to the primary beam to move therewith between a flexed position and an original position, the pin extending from a base end proximal to the primary beam and an outer end distal to the primary beam, the pin being selectively received within the opening to constrain the primary beam relative to the mating component,
wherein the primary beam is flexible to allow the pin to move inward in a first direction to the flexed position and return outward in a direction opposite to the first direction to the original position,
wherein the appliance housing further comprises a skeletal support frame, the skeletal support frame being attached to the primary beam,
wherein the skeletal support frame defines a deformation void behind the primary beam, and wherein the flexed position includes the primary beam rearward from the original position toward the deformation void.

14. The appliance housing of claim 13, wherein the pin is tapered from the base end to the outer end, such that the outer end is smaller than the base end.

15. The appliance housing of claim 13, wherein the skeletal support frame further comprises a plurality of interior beams,
  wherein the plurality of interior beams form a grid attached to the interconnected perimeter beams to constrain the confined component, the skeletal support frame, and the mating component,
  wherein the plurality of interior beams comprises two or more mutually orthogonal beams, and
  wherein one or more interior beams of the plurality of interior beams are roughly orthogonal to the primary beam.

16. The appliance housing of claim 13, wherein the primary beam and the pin are a unitary component of the appliance.

17. The appliance housing of claim 13, wherein the primary beam, the pin, and the skeletal support frame are aligned within a plane having two directions.

18. The appliance housing of claim 13, wherein the pin comprises a tapered side and an untapered side, and
  wherein the tapered side is directed upward to engage the mating component before the untapered side of the pin during installation.

19. The appliance housing of claim 13, wherein the pin constrains the skeletal support frame, the confined component, and the mating component together in the original position.

20. The appliance housing of claim 19, wherein the appliance housing further comprises a backing panel, and
  wherein the pin constrains the backing panel in addition to the skeletal support frame, the confined component, and the mating component in the original position.

* * * * *